United States Patent Office 3,369,059
Patented Feb. 13, 1968

3,369,059
MONOMERIC POLYPHOSPHITES WITH ETHER LINKAGES
Alvin Guttag, Bethesda, Md., assignor to Weston Chemical Corporation, Newark, N.J., a corporation of New Jersey
No Drawing. Filed July 27, 1965, Ser. No. 475,281
9 Claims. (Cl. 260—929)

ABSTRACT OF THE DISCLOSURE

Compounds are prepared having one of the formulae

[I]
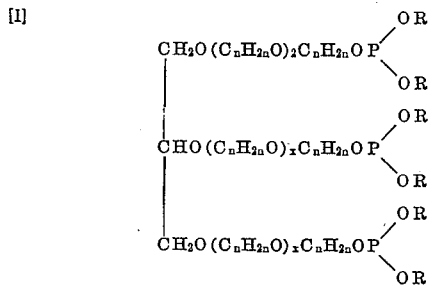

[II]
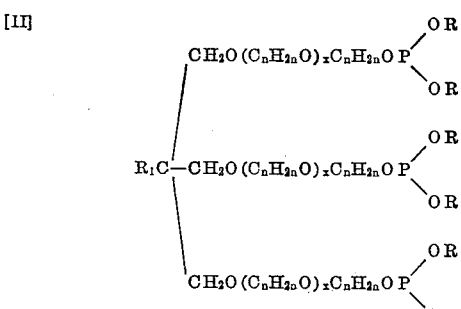

[III]
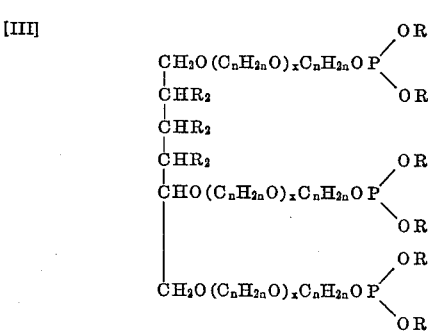

where each R is selected from the group consisting of hydrocarbyl and haloaryl, $x$ is zero or a positive integer, $n$ is a small integer of at least 2, $R_1$ is alkyl and all of the $R_2$ groups are selected from the group consisting of hydrogen and

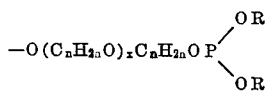

---

This invention relates to the preparation of phosphite esters.

It is an object of the present invention to prepare novel phosphite esters.

Another object is to prepare phosphite esters having good thermal stability.

A further object is to prepare phosphite esters having excellent hydrolytic stability.

An additional object is to impart improved stability to polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having one of the formulae

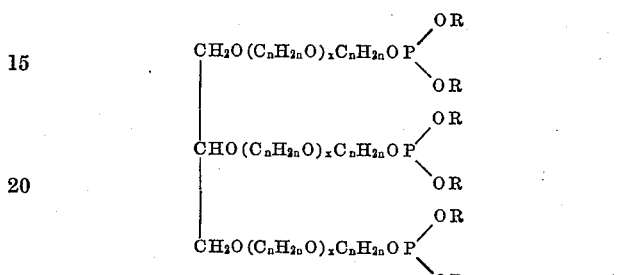
[I]

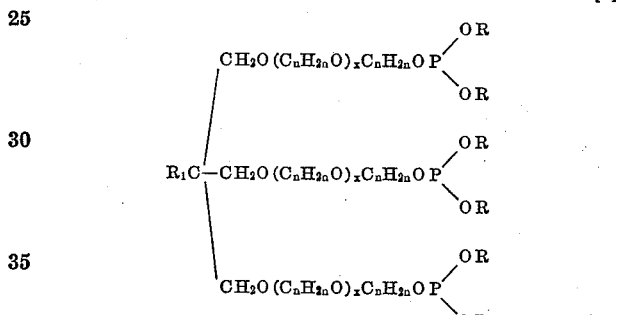
[II]

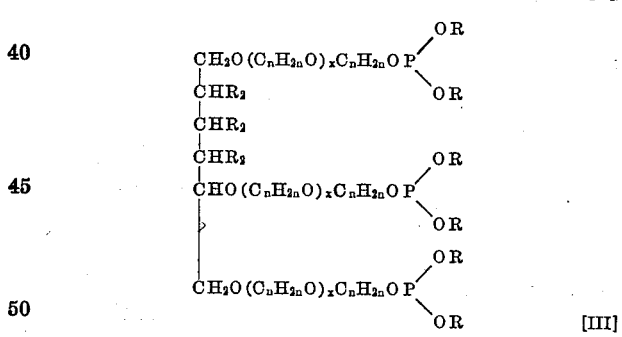
[III]

where each R is hydrocarbyl or haloaryl, e.g., alkyl, carbocyclic aryl, e.g., phenyl or alkylphenyl, or halophenyl; $x$ is zero or a positive integer, e.g., 1, 2, 3, 4 or 5; $n$ is a small integer above 1, e.g., 2, 3 or 4; $R_1$ is alkyl, preferably lower alkyl and all of the $R_2$ are either hydrogen or

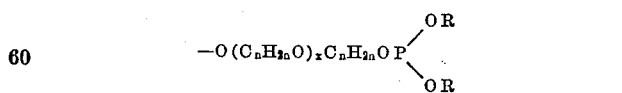

The compounds of the invention are conveniently prepared by reacting a glycerine-lower alkylene oxide adduct, a trimethylolalkane-lower alkylene oxide adduct, a hexanetriol-lower alkylene oxide adduct, or a hexitol-lower alkylene oxide adduct with a trialkyl phosphite, a triaryl phosphite, a trihaloaryl phosphite, an aryl dialkyl phosphite or a diaryl alkyl phosphite or a mixture of such phosphites in the presence of a catalyst. Sometimes it is more convenient to use a mixture of a triaryl phosphite of a low boiling phenol with either a high boiling phenol or high boiling alcohol to form the phosphite of the high boiling phenol or alcohol.

In the adduct of trimethylolpropane with propylene oxide having a molecular weight of 4000 the average value of $x$ is about 21.

As the starting phosphite there can be used alkyl, aryl and haloaryl phosphites such as trimethyl phosphite, triethyl phosphite, tripropyl phosphite, triamyl phosphite, tris octyl phosphite, tris isooctyl phosphite, tris decyl phosphite, tris isodecyl phosphite, tris octadecyl phosphite, tris dodecyl phosphite, triphenyl phosphite, tri-o-cresyl phosphite, tri-p-cresyl phosphite, tri-m-cresyl phosphite, tri xylenyl phosphite, tri ethylphenyl phosphite, tri butylphenyl phosphite, tri-p-chlorophenyl phosphite, tri-o-chlorophenyl phosphite, tri 2,4-dichlorophenyl phosphite, tri 2,4,5-trichlorophenyl phosphite, tri 2,4,6-trichlorophenyl phosphite, tri-p-bromophenyl phosphite, tri pentachlorophenyl phosphite, tri pentachlorophenyl phosphite, phenyl diisodecyl phosphite, diphenyl decyl phosphite, tri α-naphthyl phosphite, o-cresyl dioctadecyl phosphite, m-cresyl di octyl phosphite, di p-cresyl hexyl phosphite, tri dodecylphenyl phosphite.

As the high boiling alcohol or phenol which can be used with a triaryl phosphite of a relatively low boiling phenol, there can be used octylphenol, nonyl phenol, t-octyl phenol, dodecyl phenol, pentachlorophenol, pentabromophenol, butyl phenol, decyl alcohol, isodecyl alcohol, dodecyl alcohol, octyl alcohol, octadecyl alcohol, eicosanyl alcohol.

As the catalyst there can be used a dihydrocarbon phosphite or an alkaline catalyst in an amount of 0.05–5% by weight of the trihydrocarbyl or trihaloaryl phosphite reactant. Thus as catalysts there can be used dialkyl or diaryl phosphites such as diphenyl phosphite, di-o-cresyl phosphite, di-p-cresyl phosphite, di decyl phosphite, di-isodecyl phosphite, dioctadecyl phosphite, dimethyl phosphite, diethyl phosphite or dihalohydrocarbyl phosphites such as di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in a 0.1 solution.

As the adducts which can be employed in the present invention there can be used adducts of (a) glycerine, trimethylolethane, trimethylolpropane, trimethylolbutane, 1,2,6-hexanetriol, sorbitol or mannitol with (b) a lower alkylene oxide such as ethylene oxide, propylene oxide, trimethylene oxide, 1,2-butylene oxide, 1,3-butylene oxide and 1,4-butylene oxide. Such adducts have molecular weights of 226 to 1000 or more, e.g., 3000. Preferably the adducts have a molecular weight of not over 1500.

It is important that there be used at least 1 mole of the the tertiary phosphite per hydroxyl group on the lower alkylene oxide-polyhydric alcohol adduct to insure that the reaction product does not contain reactive hydroxyl groups of the type which occur when there is employed for example, 3 moles of the adduct to one mole of the tertiary phosphite as in Friedman Patents 3,081,331 and 3,142,651. The free hydroxyl groups in the Friedman patent compounds are reactive and for certain stabilizer uses are undesired.

The compounds of the present invention are useful as stabilizers for vinyl chloride resins, e.g., polyvinyl chloride, vinylchloride-vinyl acetate copolymer (87:13), vinyl chloride-vinylidene chloride (95:5), vinyl chloride-acrylonitrile (80:20). They are also useful as stabilizers for olefin polymers, e.g., polymers of monoolefins such as polyethylene, polypropylene, ethylene copolymers with monoolefins having 3–10 carbon atoms, e.g., ethylene propylene copolymer (50:50; 80:20; 20:80), ethylene-butene-1 copolymer, ethylene-isobutylene copolymer, ethylene-hexene-1 copolymer and ethylene decene-1 copolymer; ethylene-propylene-cyclopentadiene terpolymer (70:25:5); polyolefin polymers, e.g., natural rubber, butadiene-styrene copolymer (SBR rubber), cis isoprene polymer, etc. The compounds of the invention are used in an amount of 0.1–10% by weight of the polymer when employed as thermal or oxidation stabilizers.

Unless otherwise indicated, all parts and percentages are by weight.

Examples of the compounds within the present invention are hexa (isodecyl) glycerine-propylene oxide adduct molecular weight 268 triphosphite, hexa (phenyl) glycerine-propylene oxide adduct molecular weight 400 triphosphite, hexa (p-nonylphenyl) glycerine-propylene oxide adduct molecular weight 425 triphosphite, tris octyl tris phenyl glycerine-propylene oxide adduct molecular weight 425 triphosphite, hexa (p-cresyl) glycerine-propylene oxide adduct molecular weight 450 triphosphite, hexa (pentachlorophenyl) glycerine-propylene oxide adduct molecular weight 450 triphosphite, hexa (pentabromophenyl) glycerine-propylene oxide adduct molecular weight 450 triphosphite, hexa (p-chlorophenyl) glycerine-propylene oxide adduct molecular weight 450 triphosphite, hexa (o-octylphenyl) glycerine-propylene oxide adduct molecular weight 450 triphosphite, hexa (p-dodecylphenyl) glycerine-propylene oxide adduct molecular weight 450 triphosphite, hexa (octadecyl) glycerine-propylene oxide adduct molecular weight 450 triphosphite, hexa (methyl) glycerine-propylene oxide adduct molecular weight 450 triphosphite, hexa (isooctyl) glycerine-propylene oxide adduct molecular weight 450 triphosphite, hexa (dodecyl) glycerine-propylene oxide adduct molecular weight 450 triphosphite, hexa (2,4,5-trichlorophenyl) glycerine-propylene oxide adduct molecular weight 450 triphosphite, hexa (2,4,6-trichlorophenyl) glycerine-propylene oxide adduct molecular weight 450 triphosphite, hexa (2,4,6-tribromophenyl) glycerine-propylene oxide adduct molecular weight 450 triphosphite, hexa (o-nonylphenyl) glycerine-propylene oxide adduct molecular weight 1000 triphosphite, hexa (phenyl) glycerine-propylene oxide adduct molecular weight 1000 triphosphite, hexa (isodecyl) glycerine-ethylene oxide adduct molecular weight 350 triphosphite, hexa (p-nonylphenyl) glycerine-ethylene oxide adduct molecular weight 1000, hexa (phenyl) glycerine-1,2-butylene oxide adduct molecular weight 500 triphosphite, hexa (m-octylphenyl) glycerine-1,4-butylene oxide adduct molecular weight 500 triphosphite.

The adducts of trimethylolpropane with propylene oxide of molecular weights 300, 400, 700, 1500, 2500 and 4000 are available commercially as Pluracol TP 300, Pluracol TP 400, Pluracol TP 700, Pluracol TP 1500, Pluracol TP 2500 and Pluracol TP 4000. They can be used to prepare compounds of the present invention including hexa (phenyl) Pluracol TP 300 triphosphite, hexa (p-nonylphenyl) Pluracol TP 300 triphosphite, tris isodecyl tris phenyl Pluracol TP 300 triphosphite, hexa (o-cresyl) Pluracol TP 300 triphosphite, hexa (m-nonylphenyl) Pluracol TP 400 triphosphite, hexa (isodecyl) Pluracol TP 400 triphosphite, hexa (pentachlorophenyl) Pluracol TP 400 triphosphite, hexa (o-chlorophenyl) Pluracol TP 400 triphosphite, hexa (p-octylphenyl) Pluracol TP 400 triphosphite, hexa (p-dodecylphenyl) Pluracol TP 700 triphosphite, hexa (octadecyl) Pluracol TP 400 triphosphite, hexa (ethyl) Pluracol TP 1500 triphosphite, hexa (2,4,5-trichlorophenyl) Pluracol TP 400 triphosphite, hexa (2,4,6-tribromophenyl) Pluracol TP 300 triphosphite, hexa (2,4,6-trichlorophenyl) Pluracol TP 2500 triphosphite, hexa (p-nonylphenyl) trimethylolpropane ethylene oxide adduct molecular weight 275 triphosphite, hexa (phenyl) trimethylolpropane-ethylene oxide adduct molecular weight 375 triphosphite, hexa (dodecyl) trimethylolpropane-ethylene oxide adduct molecular weight 400 triphosphite, hexa (phenyl) trimethylolpropane-1,2-butylene oxide molecular weight 350 triphosphite, hexa (p-nonylphenyl) trimethylolethane-propylene oxide adduct molecular weight 300 triphosphite, hexa (isooctyl) trimethylolethane-propylene oxide adduct molecular weight 400 triphosphite, hexa (phenyl) trimethylolethane-propylene oxide adduct molecular weight 500 triphosphite, hexa (p-octylphenyl) trimethylolethane-ethylene oxide adduct molecular weight 350 triphosphite, hexa (m-nonylphenyl) trimethylolbutane-propylene oxide adduct molecular weight 450 triphosphite, hexa (phenyl) trimethylolpropane-trimethylene oxide adduct molecular weight 400 triphosphite.

The adducts of 1,2,6-hexanetriol with propylene oxide of molecular weights 750, 1500, 2400 and 4000 are available commercially as LHT 240, LHT 112, LHT 67 and LHT 42. They can be used to prepare compounds of the present invention including hexa (phenyl) LHT 240 triphosphite, hexa (p-nonylphenyl) LHT 240 triphosphite, hexa (m-cresyl) LHT 240 triphosphite, hexa (isodecyl) LHT 240 triphosphite, hexa (pentachlorophenyl) LHT 240 triphosphite, hexa (pentabromophenyl) LHT 240 triphosphite, hexa (p-chlorophenyl) LHT 240 triphosphite, hexa (p-octylphenyl) LHT 240 triphosphite, hexa (m-dodecylphenyl) LHT 240 triphosphite, hexa (octadecyl) LHT 240 triphosphite, hexa (methyl) LHT 240 triphosphite, hexa (2,4,5-trichlorophenyl) LHT 240 triphosphite, hexa (2,4,6-trichlorophenyl) LHT 240 triphosphite, hexa (p-nonylphenyl) LHT 112 triphosphite, hexa (isodecyl) LHT 112 triphosphite, hexa (phenyl) LHT 67 triphosphite. There can also be prepared lower molecular weight adduct products such as hexa (p-nonylphenyl) 1,2,6-hexanetriol-propylene oxide adduct molecular weight 300 triphosphite, as well as compounds such as hexa (p-nonylphenyl) 1,2,6-hexanetriol-ethylene oxide adduct molecular weight 400 triphosphite, hexa (isooctyl) 1,2,6-hexanetriol-ethylene oxide molecular weight 500 triphosphite and hexa (phenyl) 1,2,6-hexanetriol-1,2-butylene oxide molecular weight 500 triphosphite.

Representative of hexitol adduct products within the present invention are dodeca (isodecyl) sorbitol-propylene oxide adduct molecular weight 500 hexaphosphite, dodeca (isodecyl) sorbitol-propylene oxide adduct molecular weight 1000 hexaphosphite, dodeca (phenyl) sorbitol-propylene oxide adduct molecular weight 550 hexaphosphite, dodeca (phenyl) sorbitol-propylene oxide adduct molecular weight 1000 hexaphosphite, dodeca (p-nonylphenyl) sorbitol-propylene oxide adduct molecular weight 530 hexaphosphite, dodeca (p-nonylphenyl) sorbitol-propylene oxide adduct molecular weight 1000 hexaphosphite, hexa (isodecyl) hexa (phenyl) sorbitol-propylene oxide adduct molecular weight 1000 hexaphosphite, dodeca (p-cresyl) sorbitol-propylene oxide adduct molecular weight 530 hexaphosphite, dodeca (o-cresyl) sorbitol-propylene oxide adduct molecular weight 1000 hexaphosphite, dodeca (pentachlorophenyl) sorbitol-propylene oxide adduct molecular weight 1000 hexaphosphite, dodeca (pentabromophenyl) sorbitol-propylene oxide adduct molecular weight 550 hexaphosphite, dodeca (p-chlorophenyl) sorbitol-propylene oxide adduct molecular weight 550 hexaphosphite, dodeca (2,4,5-trichlorophenyl) sorbitol-propylene oxide adduct molecular weight 550 hexaphosphite, dodeca (2,4,6-trichlorophenyl) sorbitol-propylene oxide adduct molecular weight 1000 hexaphosphite, dodeca (m-octylphenyl) sorbitol-propylene oxide adduct molecular weight 550 hexaphosphite, dodeca (p-dodecylphenyl) sorbitol-propylene oxide adduct molecular weight 1000 hexaphosphite, dodeca (octadecyl) sorbitol-propylene oxide adduct molecular weight 550 hexaphosphite, dodeca (methyl) sorbitol-propylene oxide adduct molecular weight 1000 hexaphosphite, dodeca (p-nonylphenyl) sorbitol-ethylene oxide adduct molecular weight 450 hexaphosphite, dodeca (isoctyl) sorbitol-ethylene oxide adduct molecular weight 500 hexaphosphite, dodeca (phenyl) sorbitol-ethylene oxide adduct molecular weight 500 hexaphosphite, dodeca (p-nonylphenyl) sorbitol-trimethylene oxide adduct molecular weight 550 hexaphosphite, dodeca (isodecyl) sorbitol-1,2-butylene oxide adduct molecular weight 600 hexaphosphite.

In addition to the uses previously set forth the compounds of the present invention are stabilizers for glycols, e.g., dipropylene glycol, polypropylene glycol 2025, diethylene glycol and propylene glycol and are stabilizers for urethanes containing such glycols. They can also be employed as flame proofing agents for cellulose, cellulose esters, e.g., cellulose acetate, hydrocarbon polymers, e.g., polystyrene, polyethylene, polypropylene, ethylene-propylene copolymers and terpolymers, etc.

*Example 1*

1 mole of glycerine-propylene oxide adduct molecular weight 1000, 3 moles of triphenyl phosphite and 0.05 mole of diphenyl phosphite (catalyst) were mixed and subjected to vacuum distillation. Terminal conditions were 150° C. and 10 torr. The removal of phenol was nearly quantitative. The distillation residue was treated with 10 grams of soda ash and 10 grams of filter aid and filtered. The filtrate was hexa (phenyl) glycerine-propylene oxide adduct molecular weight 1000 triphosphite, a viscous liquid.

*Example 2*

The procedure of Example 1 was repeated replacing the glycerine-propylene oxide adduct by 1 mole of Pluracol TP 400 to produce hexa (phenyl) trimethylol-propane-propylene oxide adduct molecular weight 400 triphosphite (also called hexa (phenyl) Pluracol TP 400 triphosphite), a viscous liquid.

*Example 3*

The procedure of Example 1 was repeated replacing the glycerine-propylene oxide adduct by 1 mole of LHT 240 to produce hexa (phenyl) 1,2,6-hexanetriol-propylene oxide adduct molecular weight 750 triphosphite (also called hexa (phenyl) LHT 240 triphosphite), a viscous liquid.

*Examle 4*

The procedure of Example 1 was repeated replacing the glycerine-propylene oxide adduct by 1 mole of sorbitol-propylene oxide adduct molecular weight 1000 and by using 6 moles of triphenyl phosphite and 0.075 mole of diphenyl phosphite to produce dodeca (phenyl) sorbitol-propylene oxide adduct molecular weight 1000 hexaphosphite, a very viscous liquid.

*Example 5*

1 mole of Pluracol TP 300, 3 moles of triphenyl phosphite, 6 moles of isodecyl alcohol and 0.1 mole diphenyl phosphite (catalyst) were mixed and subjected to vacuum distillation to remove phenol. During distillation an additional 0.45 mole of isodecyl alcohol was added to replace that removed with the phenol. Over 95% of the theoretical phenol was removed. Terminal conditions were 190° C. and 10 torr. The distillation residue was treated with 15 grams of dry soda ash, 20 grams of filter aid and filtered. The filtrate was hexa (isodecyl) Pluracol TP 300 triphosphite, a viscous liquid.

*Example 6*

The procedure of Example 5 was repeated replacing the Pluracol TP 300 by 1 mole of glycerine-propylene oxide adduct molecular weight 425 to produce hexa (isodecyl) glycerine-propylene oxide adduct molecular weight 425 triphosphite, a viscous liquid.

*Example 7*

The procedure of Example 5 was repeated replacing the Pluracol TP 300 by 1 mole of LHT 240 to produce hexa (isodecyl) LHT 240 triphosphite as a viscous liquid.

*Example 8*

The procedure of Example 5 was repeated replacing the Pluracol TP 300 by 1 mole of sorbitol-propylene oxide adduct molecular weight 550 and by using 6 moles of triphenyl phosphite. During the distillation the amount of isodecyl alcohol added was 0.6 mole. The product obtained was dodeca (isodecyl) sorbitol-propylene oxide adduct molecular weight 550 hexaphosphite, a viscous liquid.

Example 9

1 mole of LHT 240, 2 moles of tris (p-nonylphenyl) phosphite, 1 mole of triphenyl phosphite and 0.05 mole of diphenyl phosphite (catalyst) were mixed and subjected to vacuum distillation. Terminal conditions were 173° C. and 10 torr. Approximately 98% of the theoretical phenol was removed. The distillation residue was treated with 10 grams of soda ash and 10 grams of filter aid. The filtrate was hexa (p-nonylphenyl) LHT 240 triphosphite. It was thermally and hydrolytically stable and was useful in stabilizing polyvinyl chloride and other polymers as set forth above. Thus it can be used in an amount of 3 parts with 100 parts of polyvinyl chloride.

Example 10

The procedure of Example 9 was repeated replacing the LHT 240 by 1 mole of glycerine-propylene oxide adduct molecular weight 1000 to produce hexa (p-nonylphenyl) glycerine-propylene oxide adduct molecular weight 1000 triphosphite as a viscous liquid. The product when used in an amount of 3 parts to 100 parts of polyvinyl chloride is an effective stabilizer.

Example 11

The procedure of Example 9 was repeated replacing the LHT 240 by 1 mole of Pluracol TP 400 to produce hexa (p-nonylphenyl) Pluracol TP 400 triphosphite as a viscous liquid. The product when used in an amount of 3 parts to 100 parts of polyvinyl chloride is an effective stabilizer.

Example 12

The procedure of Example 9 was repeated replacing the LHT 240 by 1 mole of sorbitol-propylene oxide adduct molecular weight 1000 and by using 4 moles of tris (p-nonylphenyl) phosphite, 2 moles of triphenyl phosphite and 0.075 mole of diphenyl phosphite catalyst to produce dodeca (p-nonylphenyl) sorbitol-propylene oxide adduct molecular wieght 1000 hexaphosphite as a viscous liquid. The product when used in an amount of 3 parts to 100 parts of polyvinyl chloride is an effective stabilizer.

Example 13

1 mole of sorbitol-propylene oxide adduct molecular weight 1000, 6 moles of triphenyl phosphite, 12 moles of 2,4,6-trichlorophenol and 0.075 mole of diphenyl phosphite (catalyst) were mixed and subjected to vacuum distillation until the removal of phenol was almost quantitative. The distillation residue was dodeca (2,4,6-trichlorophenol) sorbitol-propylene oxide adduct molecular weight 1000 hexaphosphite, a viscous liquid.

Example 14

1 mole of LHT 240, 3 moles of triphenyl phosphite, 6 moles of 2,4,6-trichlorophenol and 0.05 mole of diphenyl phosphite were mixed and subjected to vacuum distillation until the removal of phenol was nearly quantitative. The distillation residue was hexa (2,4,6-trichlorophenyl) LHT 240 triphosphite, a viscous liquid.

Example 15

The procedure of Example 14 was repeated replacing the LHT 240 by 1 mole of glycerine-propylene oxide adduct molecular weight 1000 to produce hexa (2,4,6-trichlorophenyl) LHT 240 triphosphite, a viscous liquid.

Example 16

The procedure of Example 14 was repeated replacing the LHT 240 by 1 mole of Pluracol TP 300 to produce hexa (2,4,6-trichlorophenyl) Pluracol TP 300 triphosphite, a viscous liquid.

What is claimed is:

1. A compound having one of the formulae

[I]
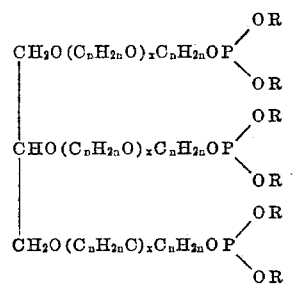

[II]
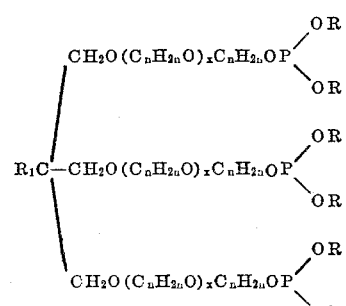

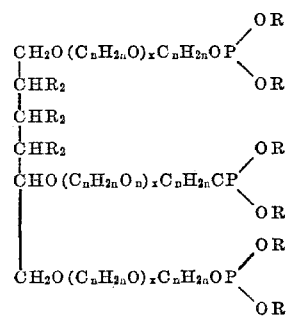

where each R is selected from the group consisting of alkyl, phenyl, alkylphenyl, chlorophenyl, bromophenyl and naphthyl, $x$ is 0 or a positive integer up to 21, $n$ is an integer of 2 to 4, $R_1$ is alkyl and all of the $R_2$ groups are selected from the group consisting of hydrogen and

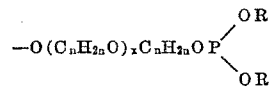

2. A compound according to claim 1 which has Formula I.

3. A compound according to claim 2 wherein $n$ is 3, $x$ is not over 5 and R is selected from the group consisting of alkyl, phenyl, alkylphenyl, chlorophenyl and bromophenyl.

4. A compound according to claim 1 which has Formula II and $R_1$ is lower alkyl.

5. A compound according to claim 4 wherein $n$ is 3, $x$ is not over 5, R is selected from the group consisting of alkyl, phenyl, alkylphenyl, chlorophenyl and bromophenyl and $R_1$ is selected from the group consisting of methyl and ethyl.

6. A compound according to claim 1 having Formula III and wherein $R_2$ is hydrogen.

7. A compound according to claim 6 wherein $n$ is 3, $x$ is not over 5 and R is selected from the group consisting of alkyl, phenyl, alkylphenyl, chlorophenyl and bromophenyl.

8. A compound according to claim 1 having Formula III and wherein $R_2$ in each instance is $$-O(C_nH_{2n}O)_xC_nH_{2n}OP\begin{smallmatrix}OR\\OR\end{smallmatrix}$$

9. A compound according to claim 8 wherein $n$ is 3, $x$ is not over 5 and R is selected from the group consisting of alkyl, phenyl, alkylphenyl, chlorophenyl and bromophenyl.

References Cited

UNITED STATES PATENTS 3,275,667  9/1966  Bohunck _____ 260—929 XR

CHARLES B. PARKER, *Primary Examiner.*

JOSEPH P. BRUST, *Examiner.*

A. H. SUTTO, *Assistant Examiner.*